3,101,366
IMPROVED PROCESS FOR ESTERIFYING TEREPHTHALIC ACID WITH ETHYLENE OXIDE

Alexander A. Vaitekunas and Harold G. Weinreb, New Haven, Conn., assignors, by mesne assignments, to Socony Mobil Oil Company, Inc., a corporation of New York
No Drawing. Filed Mar. 22, 1961, Ser. No. 97,453
7 Claims. (Cl. 260—475)

This invention relates to an improved process for the direct esterification of terephthalic acid with ethylene oxide, which enables the economical production of bis-2-hydroxyethyl terephthalate, of excellent purity and freedom from objectionable color.

In prior attempts at direct esterification, the reaction has been carried out with the use of excess ethylene oxide and under conditions resulting in the production of ester in inadequate yields and containing undesirable impurities. The impurities were such as to prevent the use of the ester in the preparation of polymerized ester of high quality suitable for conversion to tough and colorless film or filament. In addition to colored derivatives, the impurities include insoluble ether derivatives of high melting point, the presence of which is deleterious in the polymerization of the ester so that turbid polymers of inadequate physical properties result. Furthermore, such impurities are frequently difficult to remove because of interference with the obtainment of crystalline ester in a form which can readily be separated from solutions during the purification procedure.

It has been the main object of this invention to provide an economical process for the direct esterification of terephthalic acid with ethylene oxide to result in bis-2-hydroxyethyl terephthalate of good purity, well adapted for subsequent conversion to polyester having the desired characteristics. A further objective has been the provision of the proper catalytic environment and conditions to react terephthalic acid with ethylene oxide so as to form bis-ester of desired quality in high yields. Another object of this invention has been to provide conditions for the direct esterification of a dibasic acid by means of a lower alkylene oxide in the presence of an aqueous medium, whereby the formation of undesired impurities is minimized.

The foregoing and other objects have been accomplished in accordance with this invention by effecting the direct esterification within carefully regulated conditions which have been established as essential.

It is of primary importance to maintain as excess of terephthalic acid present throughout the reaction. In accordance with this requirement, the addition of ethylene oxide to the reaction mixture must be regulated to avoid excess of this reagent during the reaction and the total amount must be substantially less than the theoretical 2 moles of oxide per mole of acid. Good results have been obtained with the use of about 1.35 to 1.85 moles of ethylene oxide per mole of terephthalic acid, the preferred range being 1.7 to 1.8 moles of oxide per mole of acid.

Proper catalytic environment for the desired direct esterification process has been established as resulting from the presence in the aqueous reaction medium of an alkali metal ion at a concentration of 1.5 to 2.5 moles per liter of solution, the preferred range being 1.75 to 2 molar. While the alkali metal ion may consist of lithium, potassium, rubidium, or caesium, alone or mixed, the use of sodium ion within the above ranges of concentration is preferred. The equivalent concentration of terephthalate or acid terephthalate anion is likewise present in the reaction medium. The required catalyst concentration may be provided by the addition of alkali metal hydroxide or salt such as the terephthalate, bicarbonate, carbonate or borate to the reaction mixture. Within the stated limits of catalyst concentration, the reaction mixture constitutes a buffered system displaying a pH at 25° C. of between about 5.8 to 6.3.

Initially, the terephthalic acid is suspended by thorough agitation in at least one and a half times its weight of the catalyst solution. The use of lower proportions of solution is undesirable because of increasing difficulties in avoiding localized excess concentrations of ethylene oxide. Proportions of five or six or higher parts by weight of solution per part by weight of terephthalic acid suspended therein can be utilized. However, for optimum utilization of reaction equipment, the preferred proportion is within the range of about one and a half to four parts by weight of solution per part by weight of terephthalic acid suspended therein.

The reaction should be effected at a temperature of 105° C. to 120° C., preferably at about 110° C.

The ethylene oxide is added gradually while the reaction mixture is thoroughly agitated to maintain the terephthalic acid in suspension and the other reagents substantially uniformly distributed throughout the suspension. The addition requires 5 to 15 minutes and preferably about 10 minutes, agitation being then continued for 5 to 45 minutes. Total reaction time, including the time for the addition of the ethylene oxide, is maintained at 60 minutes or less, preferably 30 to 45 minutes.

The reaction is best effected in the absence of air, which is readily accomplished by the displacement of air from the reaction vessel by means of inert gas such as nitrogen. The ethylene oxide may be supplied to the reaction mixture as a gas or under sufficient pressure to maintain it in the liquid phase. Generally, a convenient mode of operation involves the maintenance of an inert gas pressure in the reaction vessel of 80 to 250, preferably about 100, pounds per square inch gauge. Liquid ethylene oxide may be pumped at a controlled rate into the reaction mixture from a container or transferred by the application of nitrogen pressure to the vapor space of the container. Within the above-stated procedure and conditions, the product yields and quality are of substantially the same excellence at reaction pressures ranging from slightly above atmospheric to pressures of ten to twenty atmospheres.

The reaction mixture is then cooled to a temperature of 65° to 75° C. and filtered or centrifuged to separate residual terephthalic acid and other undissolved material, which can be recycled for use in a subsequent esterification run. The separated solution is cooled to a temperature of 5° to 15° C. and allowed to stand until the ester product has crystallized. The crystalline bis-hydroxyethyl terephthalate is separated from mother liquor, washed and dried. The crystalline ester is substantially colorless, obtained at a yield of 80% or higher based on the ethylene oxide used, and is of good purity, displaying a melting point of about 109° C. or higher. The mother liquor may be recycled for use in the esterification reaction after adjustment of the alkali metal ion concentration within the above-specified limits.

The separation of the undissolved constituents of the reaction mixture is preferably carried out at a temperature of about 65° to 75° C. as the ester displays a sharp rise in solubility in water between these temperatures. The solubility increases from less than 2% at 55° C. to about 20% at 65° C. and then to about 40% at 75° C. Thus, the range of 65° to 75° C. provides optimum purification of the ester by an aqueous medium.

Likewise, the purity of the initial ester product may be enhanced by forming a solution thereof in about five to seven parts of water per part of ester, filtering and crystallizing the ester at 5° to 15° C. After the crystallized product has been washed and dried, it displays a melting point of 110° C. or over and substantially theoretical composition.

Any significant departure from the above-specified reaction conditions for the direct esterification process has been found to result in deleterious effects. When the ethylene oxide is added too rapidly or to a total extent of more than 1.85 moles per mole of acid, undesirable ether derivatives are formed in the reaction mixture. Such impurities also form if the reaction is prolonged beyond about 60 minutes or higher catalyst concentrations are used or if the reaction temperature is above about 120° C. Reaction temperatures below 105° C. or catalyst concentrations below those specified result in reduced yields of desired ester product. The formation of glycol from the oxide by reaction with water has been found to be minimal within the specified catalyst concentrations and reaction conditions. The formation of significant amounts of glycol during the esterification process is harmful not only in reducing the yield of desired ester product, but also in tending to favor an increased extent of formation of undesired impurities on further reactions with ester that is present.

The use of organic amines such as triethyl amine or pyridine, which have been proposed in the prior art as catalysts for the direct esterification reaction, have been found unsuitable under the conditions and concentrations of the present invention, leading to highly colored products which could not be decolorized by any practical method.

In the following examples, preferred embodiments in accordance with the present invention are described in detail, but are to be understood as illustrative.

*Example I*

A well-stirred suspension of 166 grams of terephthalic acid (neutral equivalent 83.1 and containing more than 99% terephthalic acid) in 300 ml. of distilled water in which 22 g. of sodium hydroxide had been dissolved, resulting in a sodium terephthalate solution containing 1.8 moles per liter of sodium ion, was heated to 110° C. in a stainless steel autoclave, after displacement of the air by nitrogen. The nitrogen pressure was adjusted to 50 p.s.i.g. and 80 grams of liquid ethylene oxide was added gradually to the well-stirred suspension during a 10 minute period. The nitrogen pressure in the autoclave was increased to 200 to 225 p.s.i.g. and the reaction mixture was maintained well agitated at 110° C. for a period of 35 minutes following the addition.

The reaction mixture was quickly cooled to 75° C., the pressure was reduced to atmospheric, and filtration was effected at 75° C. The insoluble material amounted to 15 g., consisting mainly of terephthalic acid, and was used in a subsequent esterification reaction. The filtrate was cooled to 5° C. and allowed to stand with occasional stirring for several hours to crystallize the ester.

The crystalline bis-hydroxyethyl terephthalate was filtered at 5° C., washed with two successive 200 g. portions of distilled water at 5° C. and dried to constant weight at 65° C. The yield of substantially colorless crystalline ester was 208 g., 90% of the theoretical. The melting point was 109° C., saponification number was 447.0 (theoretical 441.4) and analysis showed a content of 4.7% of mono-hydroxyethyl terephthalate.

The mother liquor was re-used in the esterification process after the desired sodium content was restored through the addition of sodium carbonate.

*Example II*

The procedure of Example I was repeated using identical conditions except for the use of alkali metal terephthalate catalyst at a 1.7 molar concentration of alkali metal ion (lithium, sodium, potassium or mixed terephthalate). In each case, 200 to 220 grams (85 to 95% of theoretical) of substantially colorless crystalline ester product was obtained displaying a melting point of 109° C. Saponification numbers were found to be close to the theoretical value of 441.4 for bis-hydroxyethyl terephthalate, and a mono-ester content of 5 to 15% was indicated.

In contrast, when the esterification was carried out under identical conditions and procedure except for lower catalyst concentrations, the yields of bis-ester were substantially decreased as follows:

|   | Alkali Metal Ion Concentration, molar | Yield, percent of theoretical |
|---|---|---|
| A | 1.0 | 75.5 |
| B | 0.6 | 66.5 |
| C | 0.2 | 50.0 |

These products were characterized by melting points of 107° to 108° C. and higher monoester content, up to about 25%.

Repetition of the procedure of Example I, with the substitution of a tertiary amine terephthalate, such as triethyl amine or pyridine, as catalyst in amounts corresponding to 1.5 to 2.5 moles of tertiary amine per liter of solution resulted in colored products. These materials could not be decolorized and purified by crystallization from solution even after treatment of the solution with activated charcoal.

The bis-ester products resulting from Examples I or II are readily convertible by a single recrystallization to bis-ester of exceptionally high purity. For example, an aqueous solution containing 5 parts by weight of water per part by weight of ester is prepared, heated while stirring to 65° to 75° C. and separated from any insoluble components by filtration or centrifuging, after neutralization or other treatment, for example with activated charcoal, if desired. The clarified solution is cooled to 5° to 10° C. to crystallize the bis-hydroxyethyl terephthalate. The crystalline product is washed several times with cold distilled water and vacuum dried at 80°–90° C. The crystalline ester displays a melting point over 110° C., for example 110.4° C., the saponification number being close to the theoretical value of 441.4, for example 443.0, and is substantially free of mono-ester.

The bis-ester product produced in accordance with this invention is characterized in general by yielding a substantially clear colorless melt on being heated to above the melting point and by being readily polymerizable to substantially clear and colorless polyester of high quality.

Polymerization is readily accomplished by mixing 100 parts by weight of the bis-ester with 0.036 parts by weight of zinc acetate dihydrate and heating to 275°–280° C. in an atmosphere of nitrogen in a suitable polymerization vessel. This temperature is maintained for 4–5 hours, the pressure being reduced in the final hour or two to 0.4 to 0.6 mm. of mercury. A clear and colorless polyester having an intrinsic viscosity of about 0.6 or higher is produced, readily adapted for conversion to high strength film, filaments and molded articles. In contrast, bis-ester products resulting from prior art methods, even after recrystallization, when polymerized as above described yielded colored turbid polymer of inferior properties.

It is noteworthy that the obtainment of bis-ester in consistently high yields and quality in accordance with this invention requires operation within the limits specified above. In particular, the catalyst concentration must be such as to provide an alkali metal or ammonium ion concentration between about 1.5 to 2.5 moles per liter, the preferred catalyst being sodium terephthalate containing about 1.75 to 2.0 moles per liter of sodium ion. Precautions must be observed to avoid the use of more than 1.85 moles of ethylene oxide per mole of terephthalic acid present in the reaction mixture as well as to avoid the presence of excess oxide by too rapid addition or inadequate stirring during the initial phase of the reaction. Adequate regulation to avoid any temporary excess of oxide is readily available, for example, through control of the rate of addition so that any appreciable increase in the pressure within the reaction vessel is avoided during the addition of the ethylene oxide.

It will further be understood that the advantages of the process of this invention are likewise available in the direct esterification with ethylene oxide in the presence of an aqueous medium of terephthalic acid admixed with isophthalic acid. Such mixtures, advantageously containing 5 to 95% of terephthalic acid, may be treated in accordance with this invention to produce bis-hydroxyethyl esters of high quality at yields exceeding 80% of theoretical and generally over 90%.

What is claimed is:

1. In the production of bis-hydroxyethyl terephthalate by the direct esterification of terephthalic acid with ethylene oxide in the presence of an aqueous medium, the process comprising providing a suspension of terephthalic acid in 1.5 to 4 times its weight of an aqueous solution of an alkali metal terephthalate at a temperature of 105° to 120° C., said solution containing 1.5 to 2.5 moles of alkali metal ion per liter, gradually adding in five to fifteen minutes to said suspension during agitation 1.35 to 1.85 moles of ethylene oxide per mole of terephthalic acid, continuing the agitation at said temperature for a total period of not over 60 minutes, and recovering the bis-ester from said solution.

2. In the production of bis-hydroxyethyl terephthalate by the direct esterification of terephthalic acid with ethylene oxide in the presence of an aqueous medium, the process comprising providing a suspension of terephthalic acid in 1.5 to 4 times its weight of an aqueous solution of sodium terephthalate at a temperature of 105° to 120° C., said solution containing 1.5 to 2.5 moles of sodium ion per liter, gradually adding in five to fifteen minutes to said suspension during agitation 1.35 to 1.85 moles of ethylene oxide per mole of terephthalic acid, continuing the agitation at said temperature for a total period of 30 to 45 minutes, and recovering the bis-ester from the said solution.

3. The process in accordance with claim 1, wherein the temperature is maintained at about 110° C.

4. The process in accordance with claim 2, wherein the terephthalate solution contains 1.75 to 2.0 moles per liter of sodium ion.

5. The process in accordance with claim 2, wherein 1.7 to 1.8 moles of ethylene oxide are added per mole of terephthalic acid.

6. In the production of bis-hydroxyethyl terephthalate by the direct esterification of terephthalic acid with ethylene oxide in the presence of an aqueous medium, the process comprising providing a suspension of terephthalic acid in 1.5 to 4 times its weight of an aqueous solution of an alkali metal terephthalate at a temperature of about 100° C., said solution containing 1.5 to 2.5 moles of alkali metal ion per liter, providing an inert gas over said solution at a pressure in excess of atmospheric and up to twenty atmospheres gauge, adding in five to fifteen minutes to said suspension during agitation without substantial increase in said pressure 1.35 to 1.85 moles of ethylene oxide per mole of terephthalic acid, continuing the agitation at said temperature for a total period of 30 to 45 minutes, and recovering the bis-ester from the said solution.

7. In the production of bis-hydroxyethyl terephthalate by the direct esterification of terephthalic acid with ethylene oxide in the presence of an aqueous medium, the process comprising providing a suspension of terephthalic acid in 1.5 to 4 times its weight of an aqueous solution of an alkali metal terephthalate at a temperature of about 110° C., said solution containing 1.5 to 2.5 moles of alkali metal ion per liter, providing an inert gas over said solution at a pressure in excess of atmospheric and up to twenty atmospheres gauge, adding in 5 to 15 minutes to said suspension during agitation without substantial increase in said pressure 1.35 to 1.85 moles of ethylene oxide per mole of terephthalic acid, continuing the agitation at said temperature for a total period of 30 to 45 minutes, cooling the reaction mixture to 65°–75° C., filtering the unreacted terephthalic acid from the reaction medium and recovering the bis-ester from the filtrate.

References Cited in the file of this patent

UNITED STATES PATENTS

| 2,932,662 | Ringwald | Apr. 12, 1960 |

FOREIGN PATENTS

| 623,669 | Great Britain | May 20, 1949 |
| 205,719 | Australia | Jan. 21, 1957 |

UNITED STATES PATENT OFFICE
CERTIFICATE OF CORRECTION

Patent No. 3,101,366                                                August 20, 1963

Alexander A. Vaitekunas et al.

It is hereby certified that error appears in the above numbered patent requiring correction and that the said Letters Patent should read as corrected below.

Column 1, line 50, for "as" read -- an --; column 6, line 10, for "100° C." read -- 110° C. --.

Signed and sealed this 12th day of May 1964.

(SEAL)
Attest:
ERNEST W. SWIDER

Attesting Officer

EDWARD J. BRENNER
Commissioner of Patents